Sept. 6, 1960  G. W. HAAB  2,951,323
CASING MACHINE

Filed April 30, 1956  12 Sheets-Sheet 1

INVENTOR
Gordon W. Haab

BY Mason, Fenwick & Lawrence
ATTORNEYS

Sept. 6, 1960

G. W. HAAB 2,951,323

CASING MACHINE

Filed April 30, 1956

INVENTOR
Gordon W. Haab

BY Mason, Fenwick & Lawrence
ATTORNEYS

Sept. 6, 1960

G. W. HAAB 2,951,323

CASING MACHINE

Filed April 30, 1956

INVENTOR
Gordon W. Haab
BY Mason, Fenwick & Lawrence
ATTORNEYS

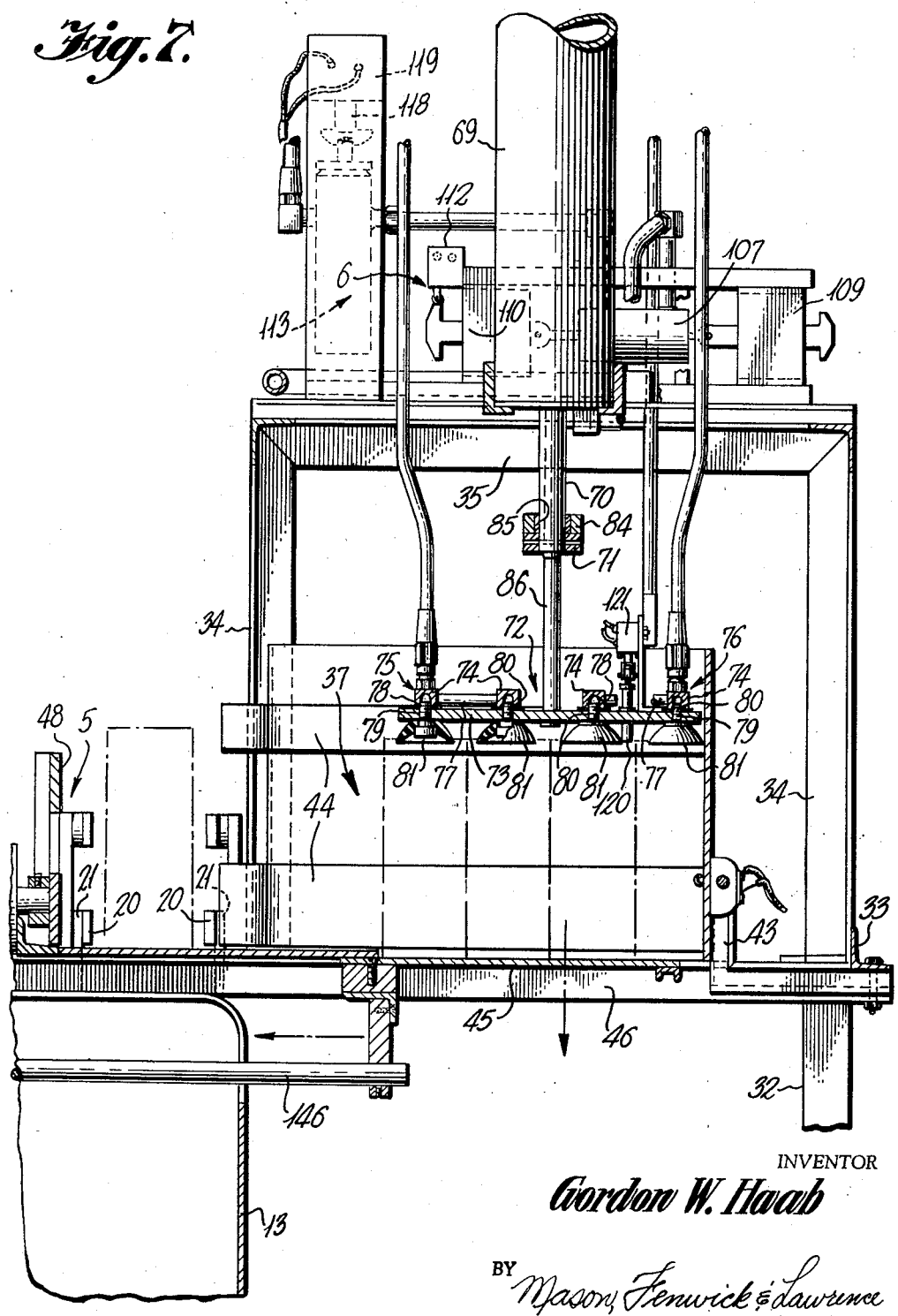

Sept. 6, 1960 G. W. HAAB 2,951,323
CASING MACHINE
Filed April 30, 1956 12 Sheets-Sheet 8

INVENTOR
Gordon W. Haab
BY Mason, Fenwick & Lawrence
ATTORNEYS

Sept. 6, 1960 G. W. HAAB 2,951,323
CASING MACHINE
Filed April 30, 1956 12 Sheets-Sheet 9
Fig. 12.
Fig. 13. Fig. 21.
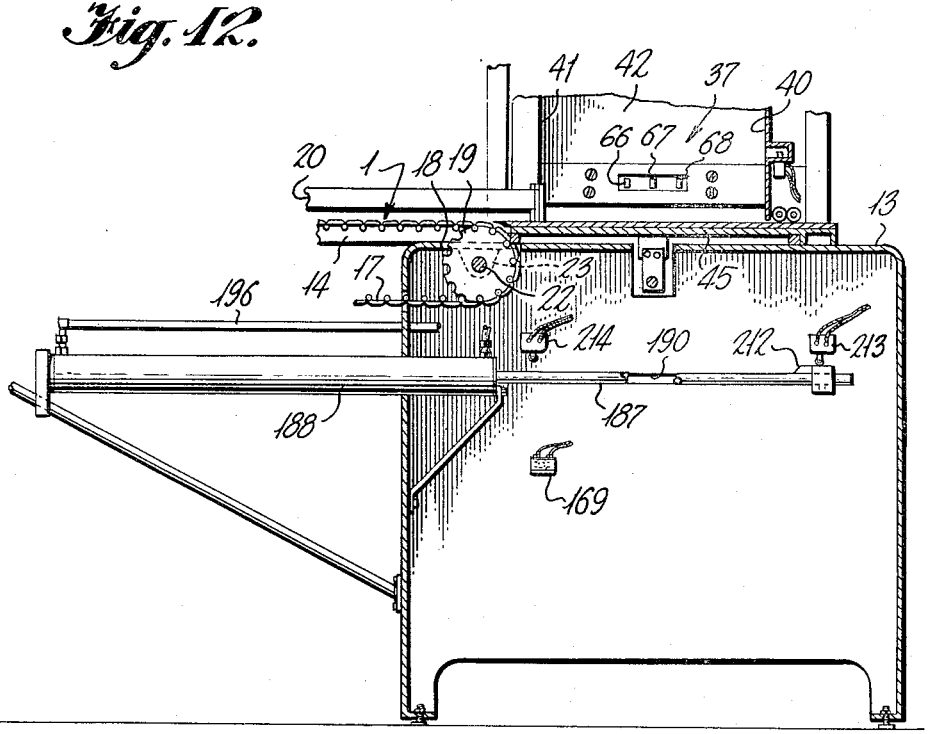
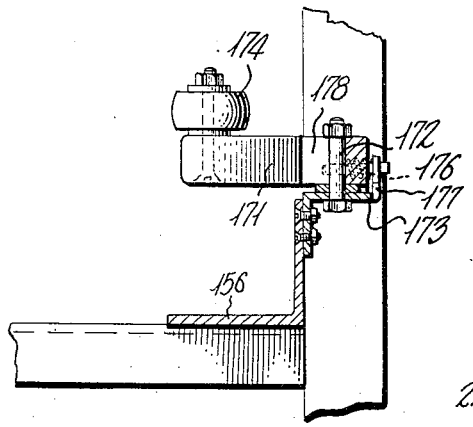
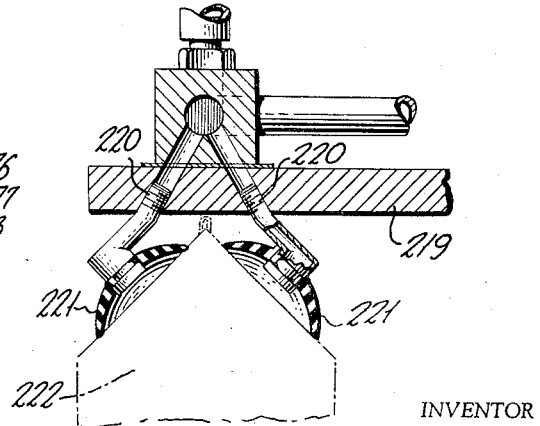
INVENTOR
Gordon W. Haab
BY Mason, Fenwick & Lawrence
ATTORNEYS

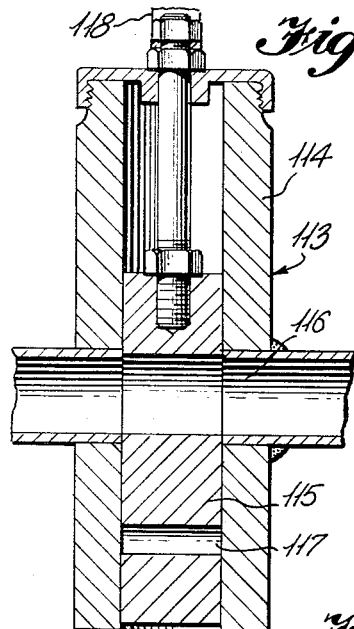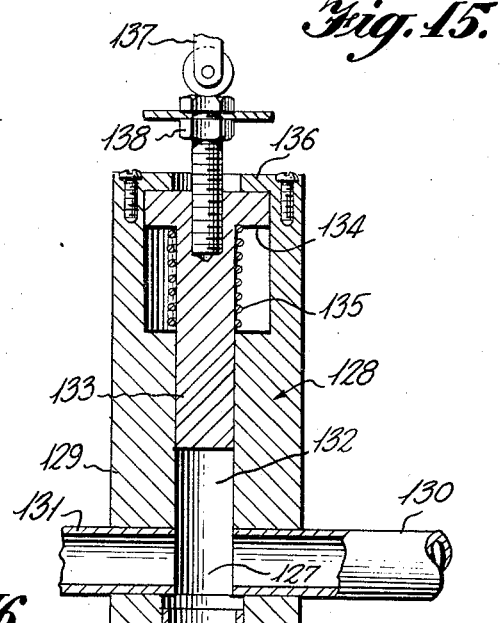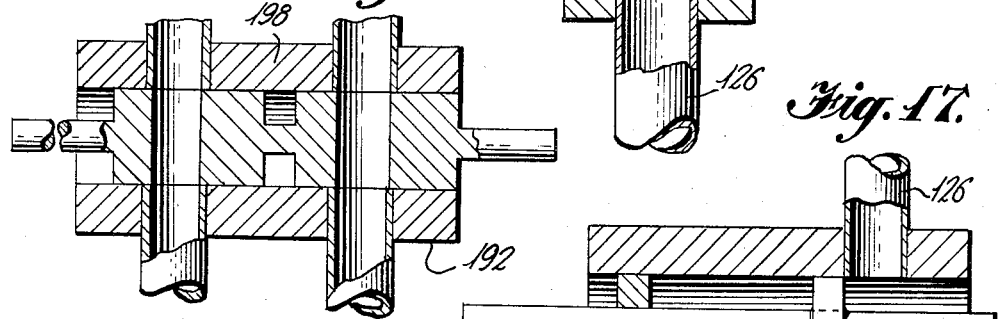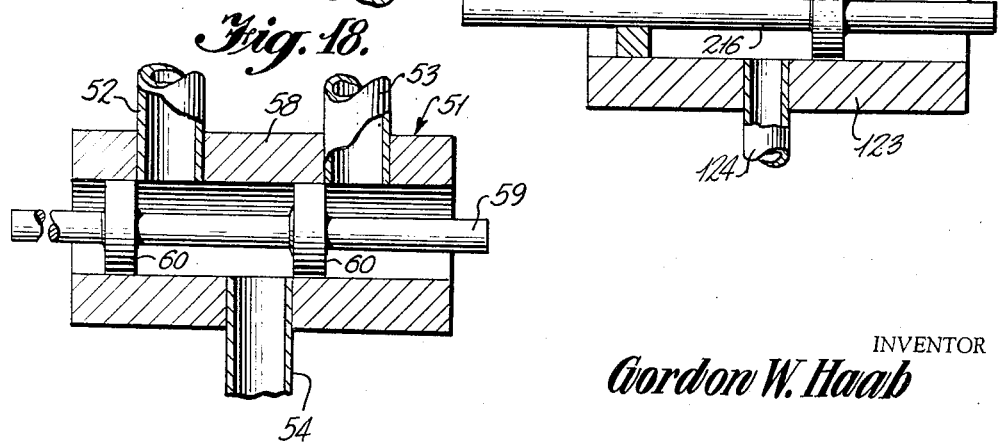

Sept. 6, 1960

G. W. HAAB 2,951,323

CASING MACHINE

Filed April 30, 1956

INVENTOR
*Gordon W. Haab*

BY
*Mason, Fenwick & Lawrence*
ATTORNEYS

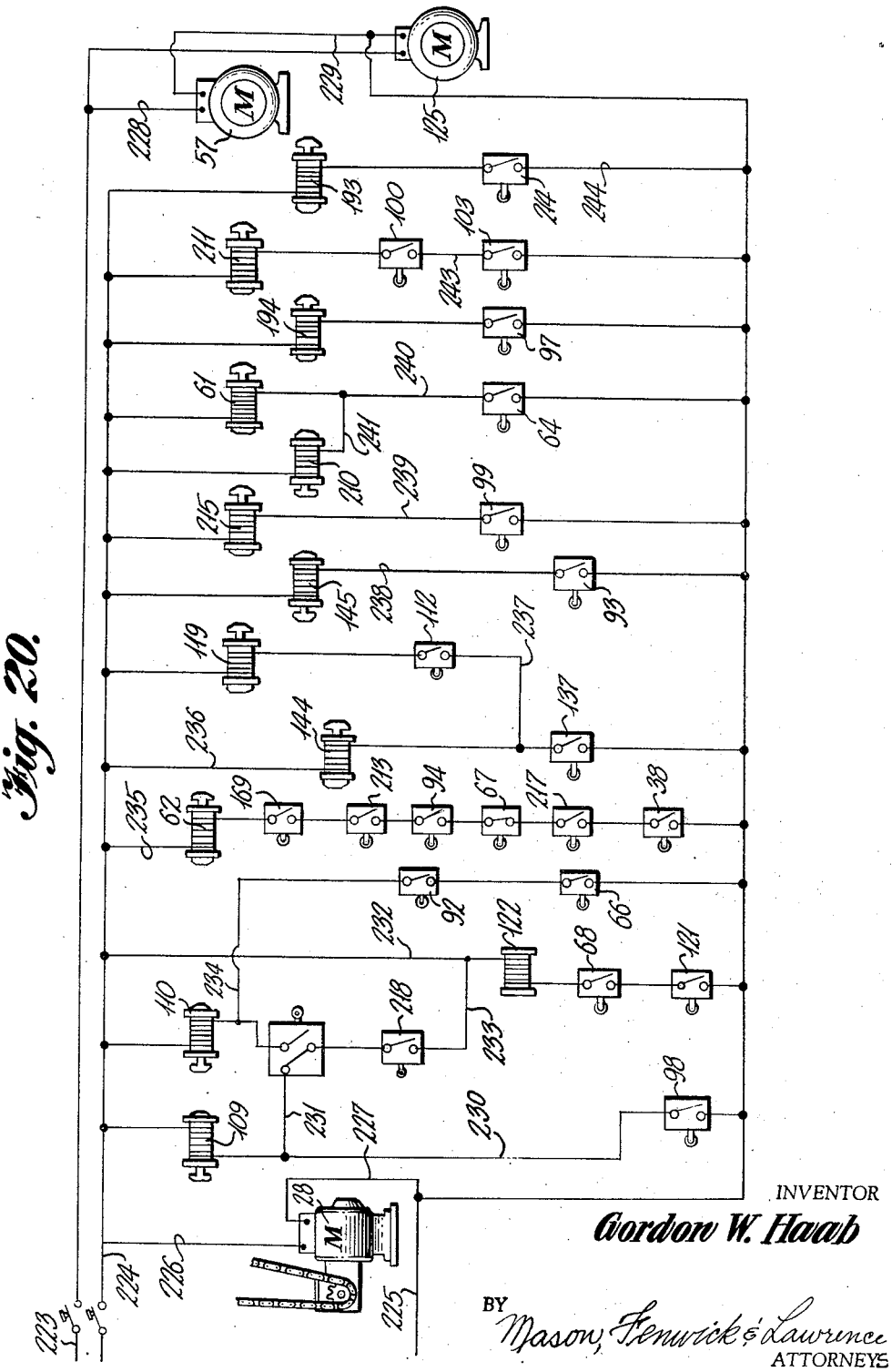

United States Patent Office 2,951,323
Patented Sept. 6, 1960

2,951,323

CASING MACHINE

Gordon W. Haab, 2203 Oakwood Lane, Richmond, Va.

Filed Apr. 30, 1956, Ser. No. 581,574

22 Claims. (Cl. 53—61)

This invention relates to casing machines, and more particularly to such machines which will automatically case paper milk cartons, glass containers, canned goods, etc., and then eject the full case.

Many machines have been proposed for casing articles of all kinds; and a number of them work on the principle of feeding the articles to be cased to the machine in single file, transferring successive groups of articles transversely of the feed line to form adjacent rows to build up a load or layer for casing and then transferring the load or layer vertically into a case positioned beneath the accumulating station. Casers of this type have worked very well where the articles being cased could stand relatively rough treatment. Considerable breakage occurred when known casing machines were used to handle fragile articles. The known machines were designed to handle articles of one size and shape only and considerable modification was necessary to adapt them to case articles of different shape or size. These casers were precision machines involving close tolerances and accurate timing. Minute size variation has been sufficient to cause the machines to jam, which in many cases resulted in breakage either to the machine or the articles being cased.

The primary object of the present invention is to provide a casing machine which will handle fragile articles at high speed and without breakage.

Another object of the present invention is to provide a casing machine in which the vertical transfer mechanism is inoperative to lower articles until all of the articles of the load or layer have been securely gripped.

A further object is the provision of means to lift the articles from the support on which they are assembled prior to retraction of the assembly support so that the loading of the transfer mechanism is uniform and there can be no canting of the lowering head caused by imposing the load on the head progressively from side to side or by the frictional contact of the moving support against the under-surface of the articles being cased.

A still further object is to provide a machine of this character which is capable of casing articles of different height without adjustment of the machine. The machine automatically adapts its operation to the height of the articles fed to it.

Yet another object is the provision of a casing machine wherein the case-ejecting mechanism remains inoperative until the case is filled whether a single layer or a plurality of layers of articles are required to fill the case.

It is a further object of the present invention to provide a casing machine in which cases of slightly varying widths can be accommodated and each will be accurately aligned for loading and the next succeeding case held back until the case ahead of it has been loaded and fully ejected from the machine.

Another object is the provision of a casing machine which is completely flexible as to its speeds, i.e., one in which the over-all speed is adjustable and in which the relative speeds of the several parts are adjustable.

The invention also contemplates a casing machine which with very slight modification can be adapted to operate with articles or containers of different shapes.

Yet another object of the invention is the provision of such a machine in which the several mechanisms are so designed that each is a separate unit for ease in assembly and disassembly, thus greatly facilitating maintenance and repair.

Still another object is to provide a machine of this character in which all of the parts are vacuum operated whereby adequate power is obtained but the force of the moving parts will be arrested in the event of jamming and breakage will be avoided.

Other objects of the invention will become apparent from the following description of practical embodiments thereof when taken in conjunction with the drawings which accompany and form part of this specification.

In the drawings:

Figure 7 is a vertical section taken at right angles to Figure 6 and on the line 7—7 of Figure 6;

Figure 8 is a detail view showing in plan a switch operating mechanism actuated by movement of the accumulating table;

Figure 12 is a vertical section through the main housing illustrating a portion of the ejector mechanism and is taken on the line 12—12 of Figure 5;

Figure 13 is a vertical section through a portion of the case runway showing the case positioning mechanism and is taken on the line 13—13 of Figure 3;

Figure 14 is a vertical section through a choke valve used in connection with the vertical transfer mechanism;

Figure 15 is a vertical section through a vacuum responsive unit forming part of the vertical transfer mechanism;

Figure 16 is a horizontal section through a cut-off valve;

Figure 17 is a horizontal section through a flow control valve used in the vacuum cup line;

Figure 18 is a horizontal section through a flow control valve illustrative of several used in the machine;

Figure 20 is a diagram of the electrical control members and the manner in which they are connected into the power line; and Figure 21 is a vertical section through a portion of a modified form of vertical transfer carriage.

The casing machine of the present invention is capable of casing articles or containers of many different kinds. The machine shown and described is designed for casing paper milk cartons, but can be used with containers having a flat, or nearly flat, top. The description, however, will be confined to paper milk cartons.

In general, the machine has means for feeding in continuous single file the articles to be cased, moving groups of the articles so fed transversely of the feed path to assemble a predetermined number of rows of articles upon an accumulating support or table, lifting an assembled load or layer, of articles from the table, retracting the table, lowering the load, or layer, into a case which has been fed into the machine and accurately positioned beneath the table, and ejecting the case when full. The vertical transfer mechanism continues to operate until the case is filled, and is rendered inoperative only when the case-ejector mechanism is energized. The various movements of this sequence are caused to occur through proper movement of a series of vacuum flow control valves by operation of a plurality of micro switches which energize solenoids to move the valves. The operation of the micro-switches is entirely automatic.

Figure 1:
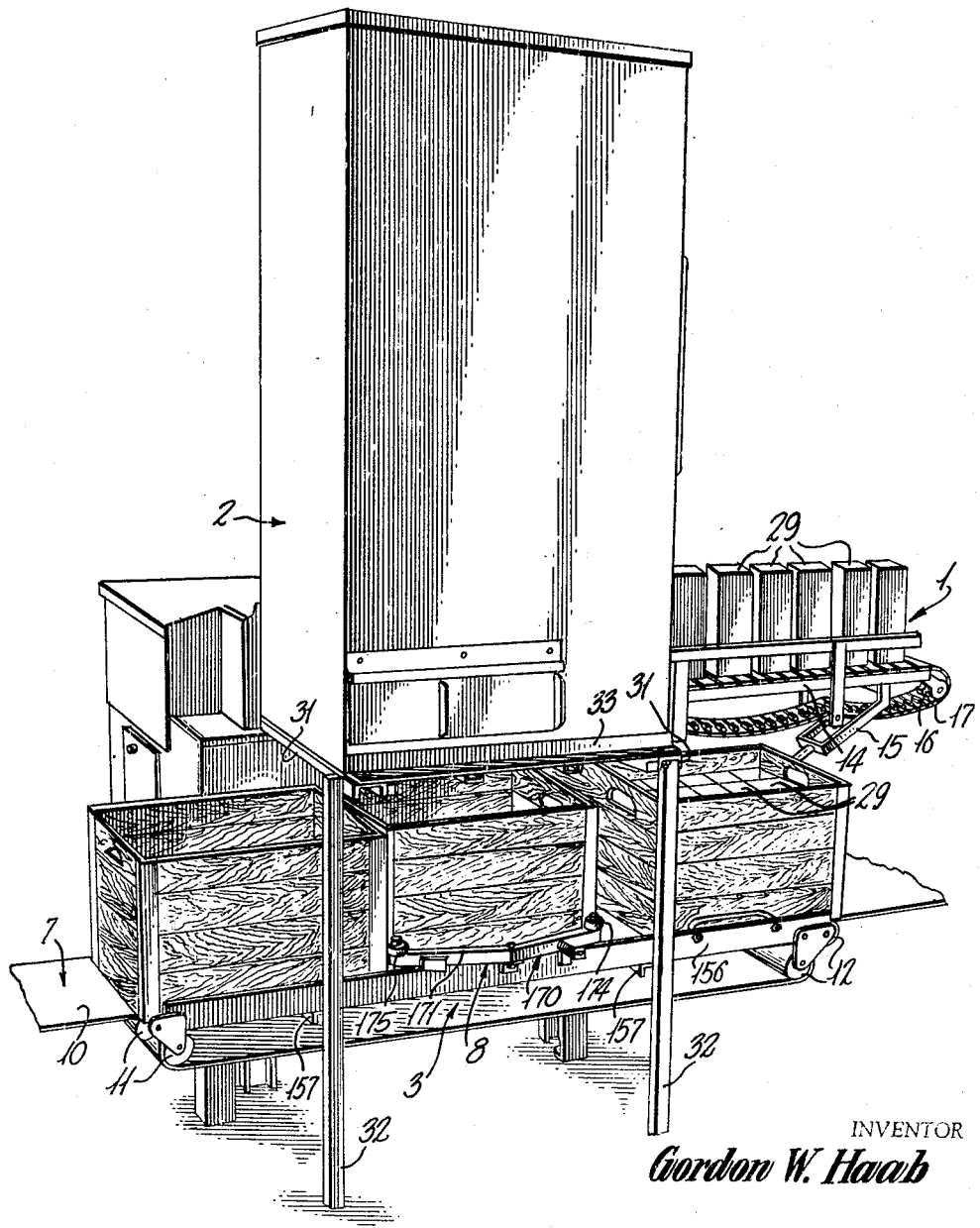
Figure 1 is a perspective view of a casing machine embodying the principles of the present invention.
Figure 2:
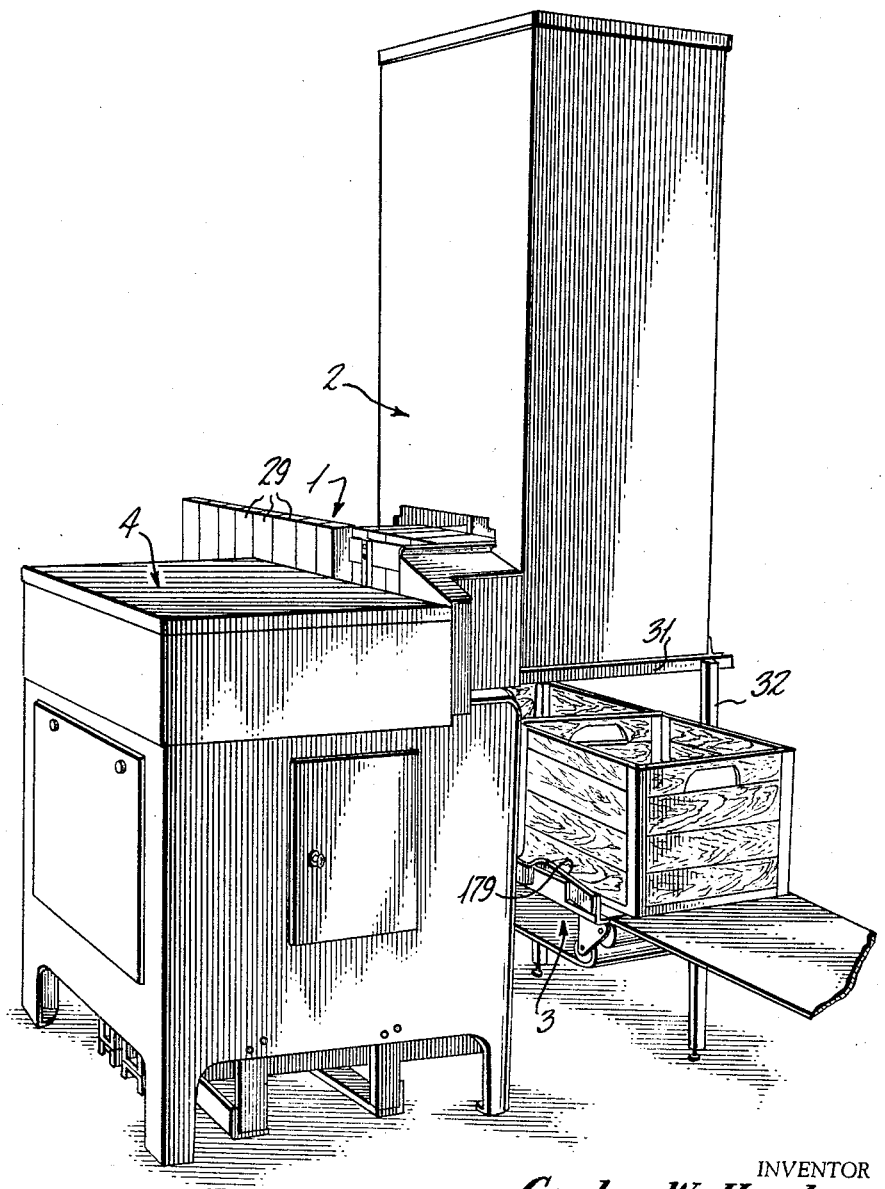
Figure 2 is a perspective view of the machine as viewed from the rear.
Figure 3:
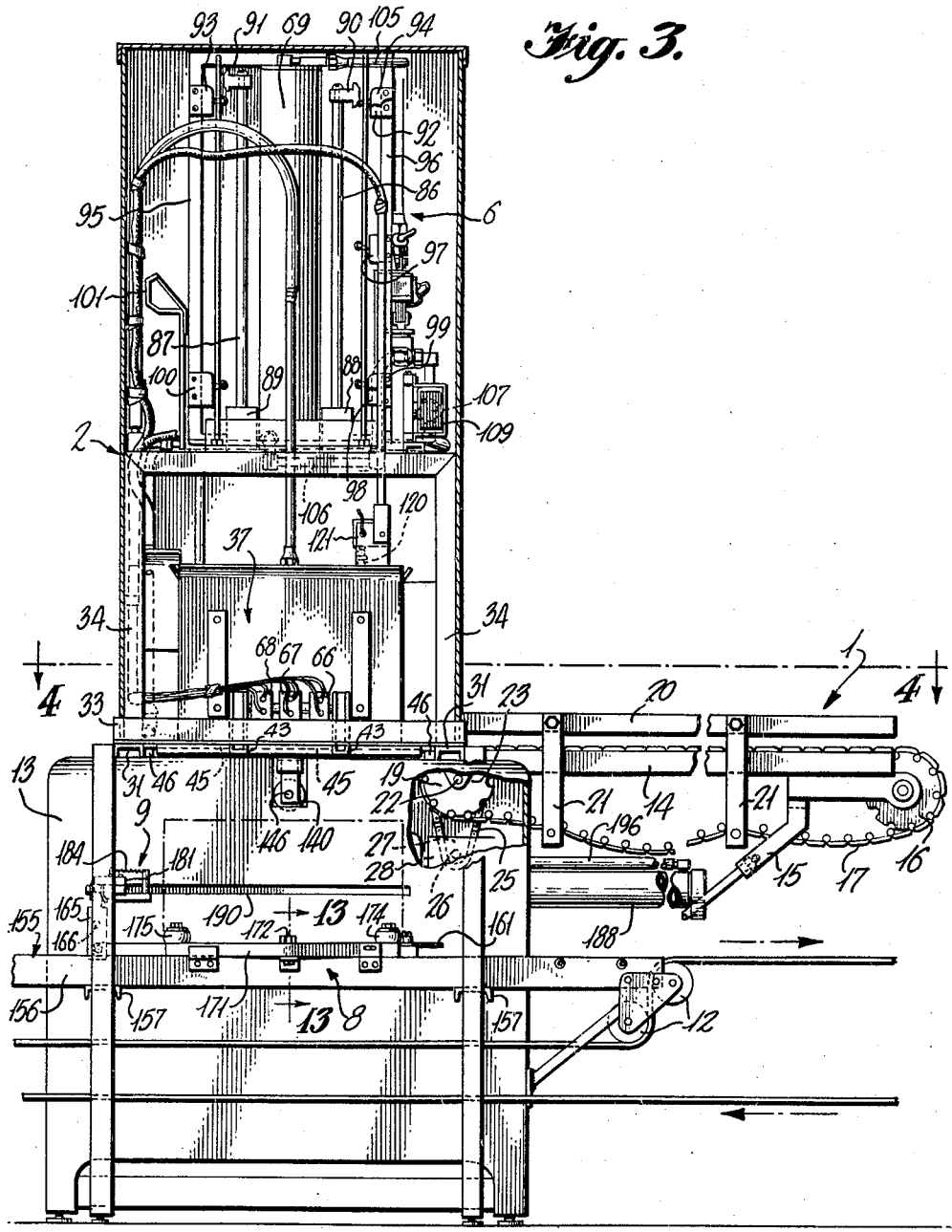
Figure 3 is a front elevation of the machine with some of the upper casing being broken in section to show the interior mechanism.
Figure 4:
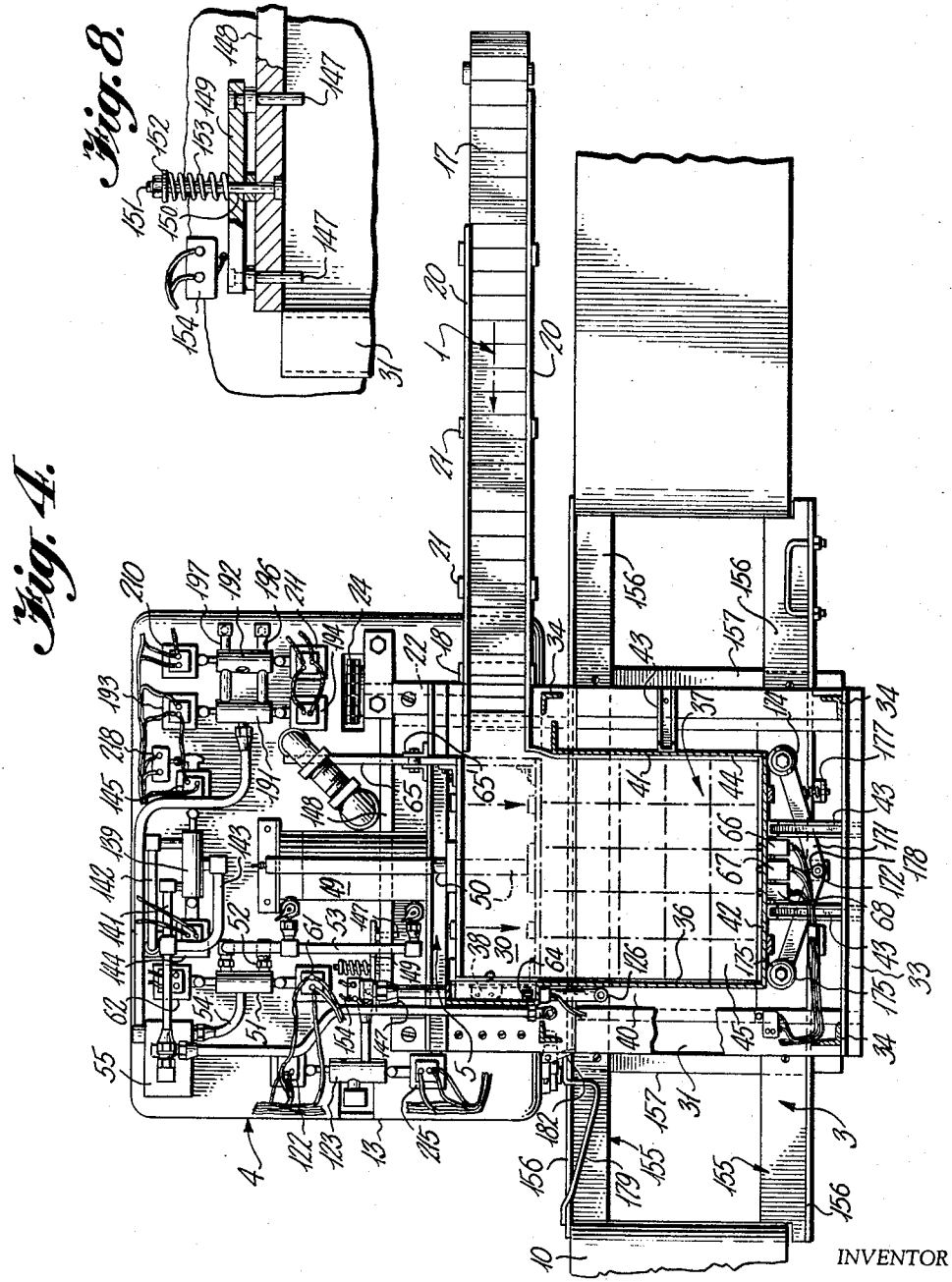
Figure 4 is a horizontal section taken on the line 4—4 of Figure 3, viewing much of the machine in top plan.
Figure 5:
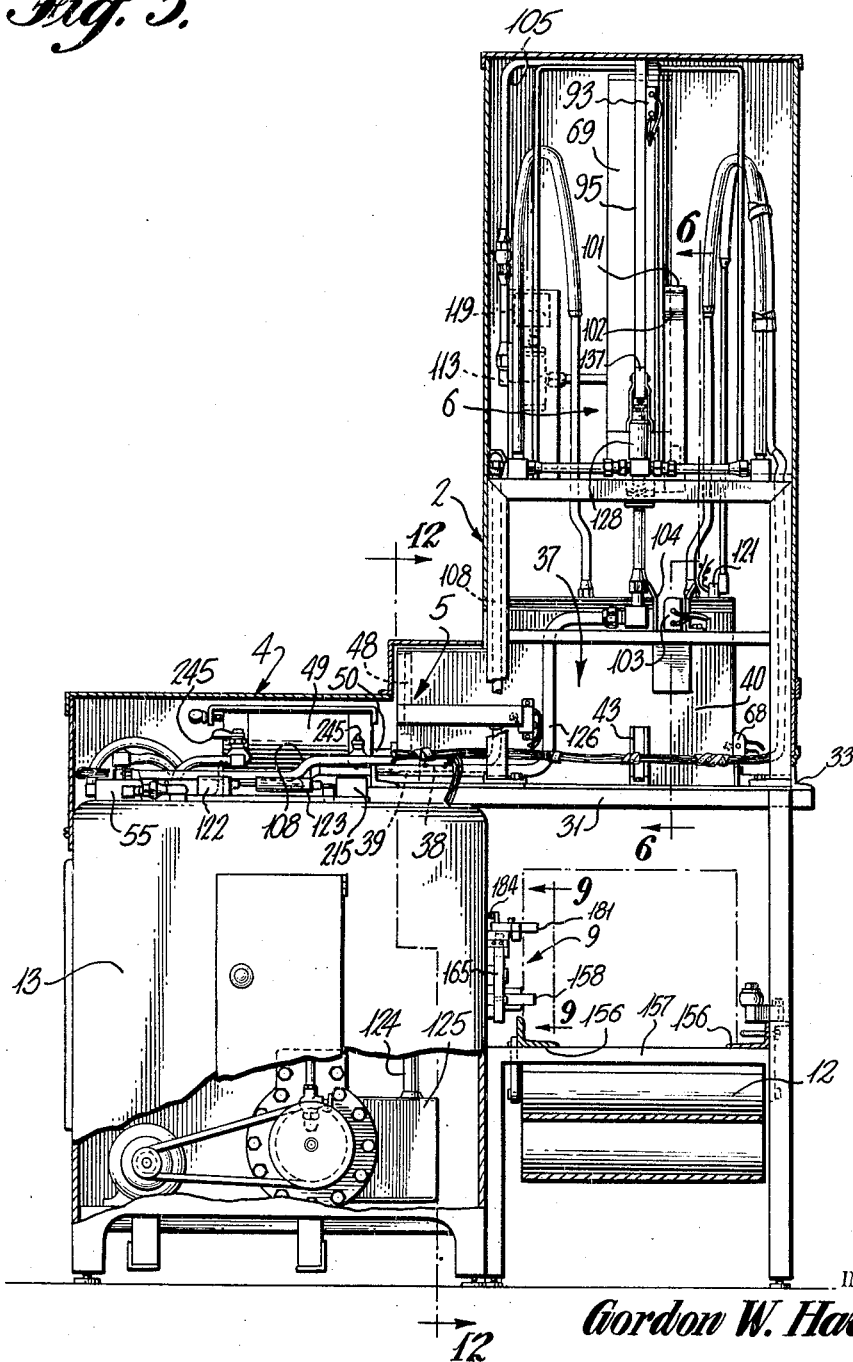
Figure 5 is a side elevation of the machine with parts of the casing being broken away.
Figure 6:
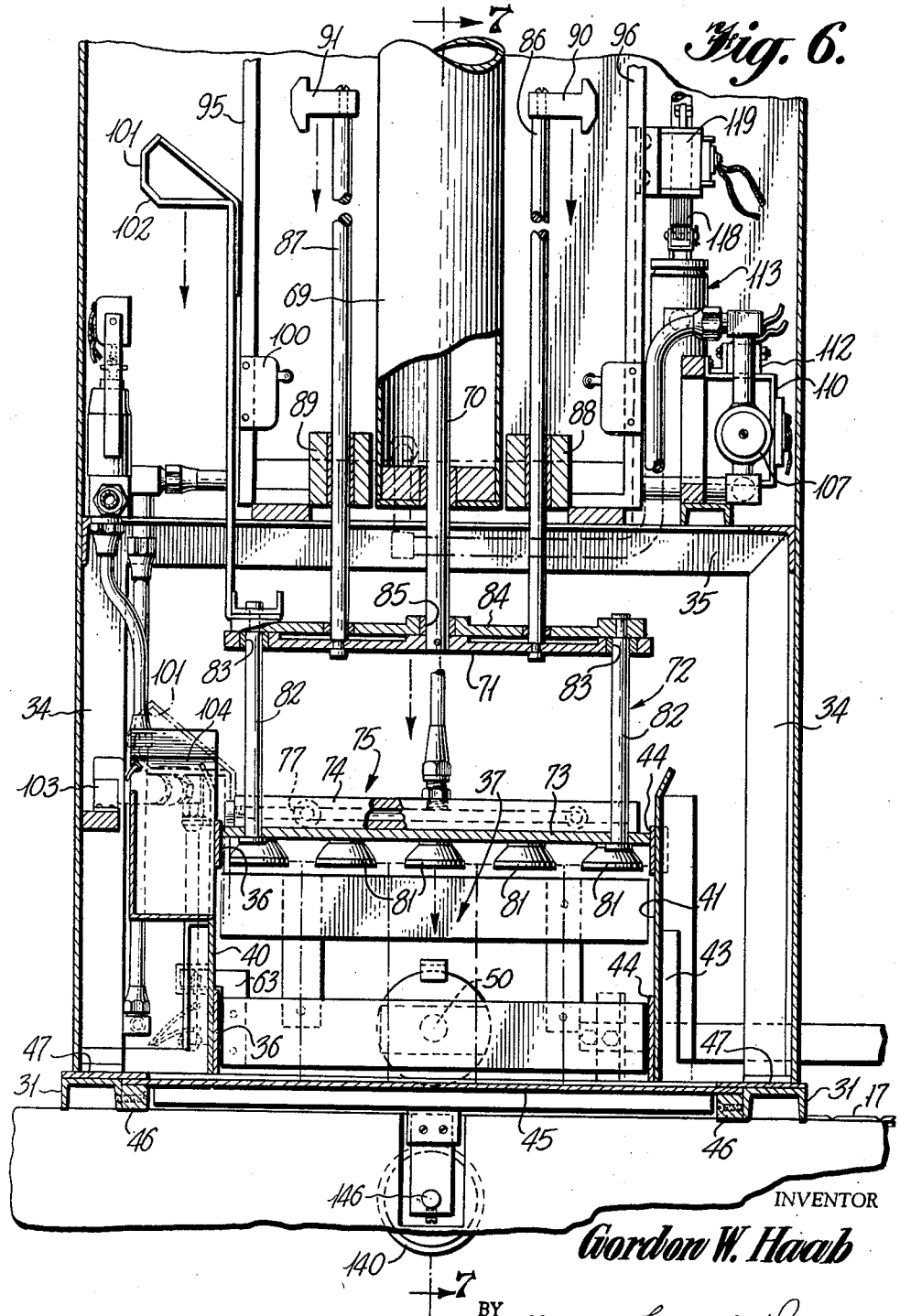
Figure 6 is a fragmentary section on an enlarged scale, taken on the line 6—6 of Figure 5, showing the vertical transfer mechanism and accumulating chamber structure.
Figure 9:
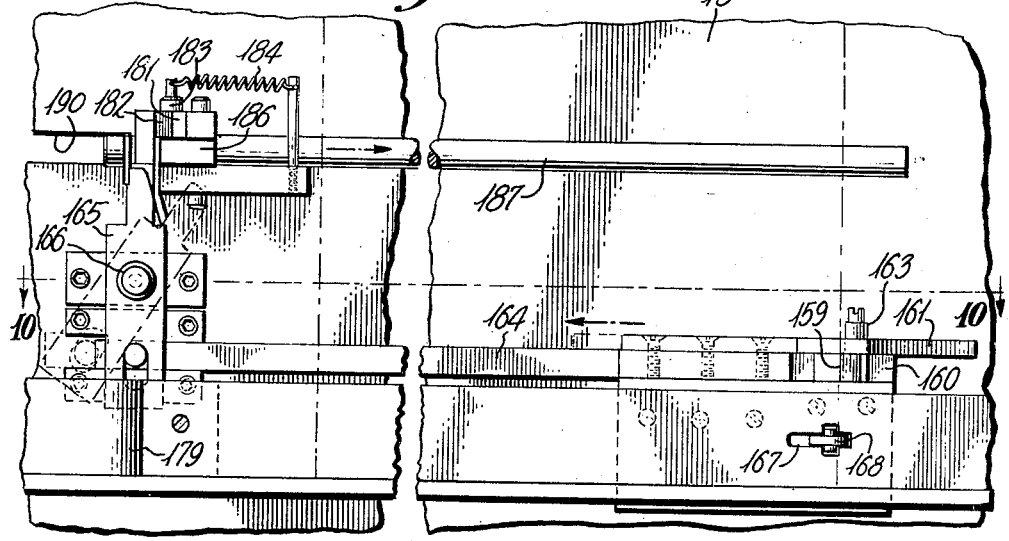
Figure 9 is a partial front elevation on an enlarged scale showing the case stop and case ejecting mechanism.
Figure 10:
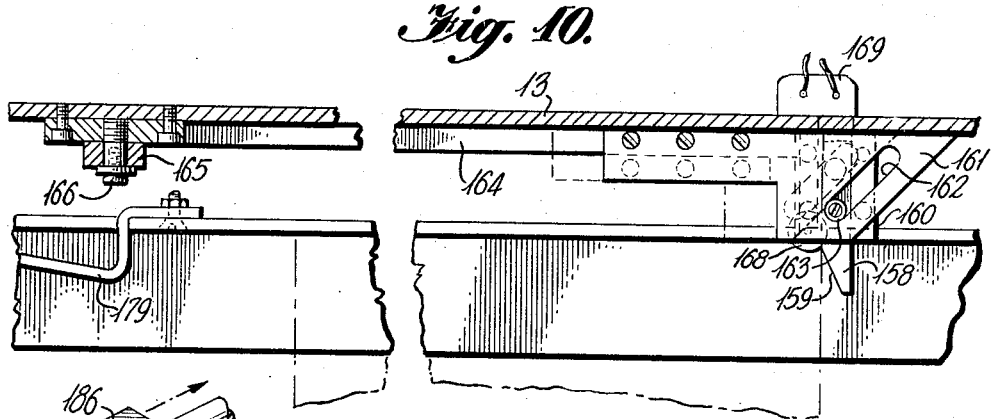
Figure 10 is a horizontal section through the structure shown in Figure 9 and is taken on the line 10—10 of Figure 9.
Figure 11:
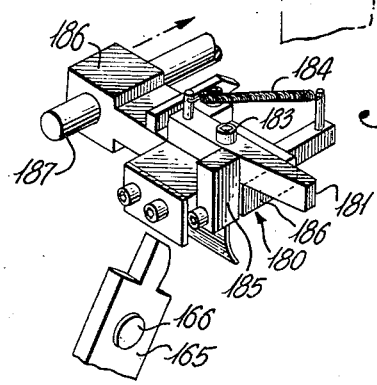
Figure 11 is a perspective view of the ejector carriage and a portion of the case stop operating lever.
Figure 19:
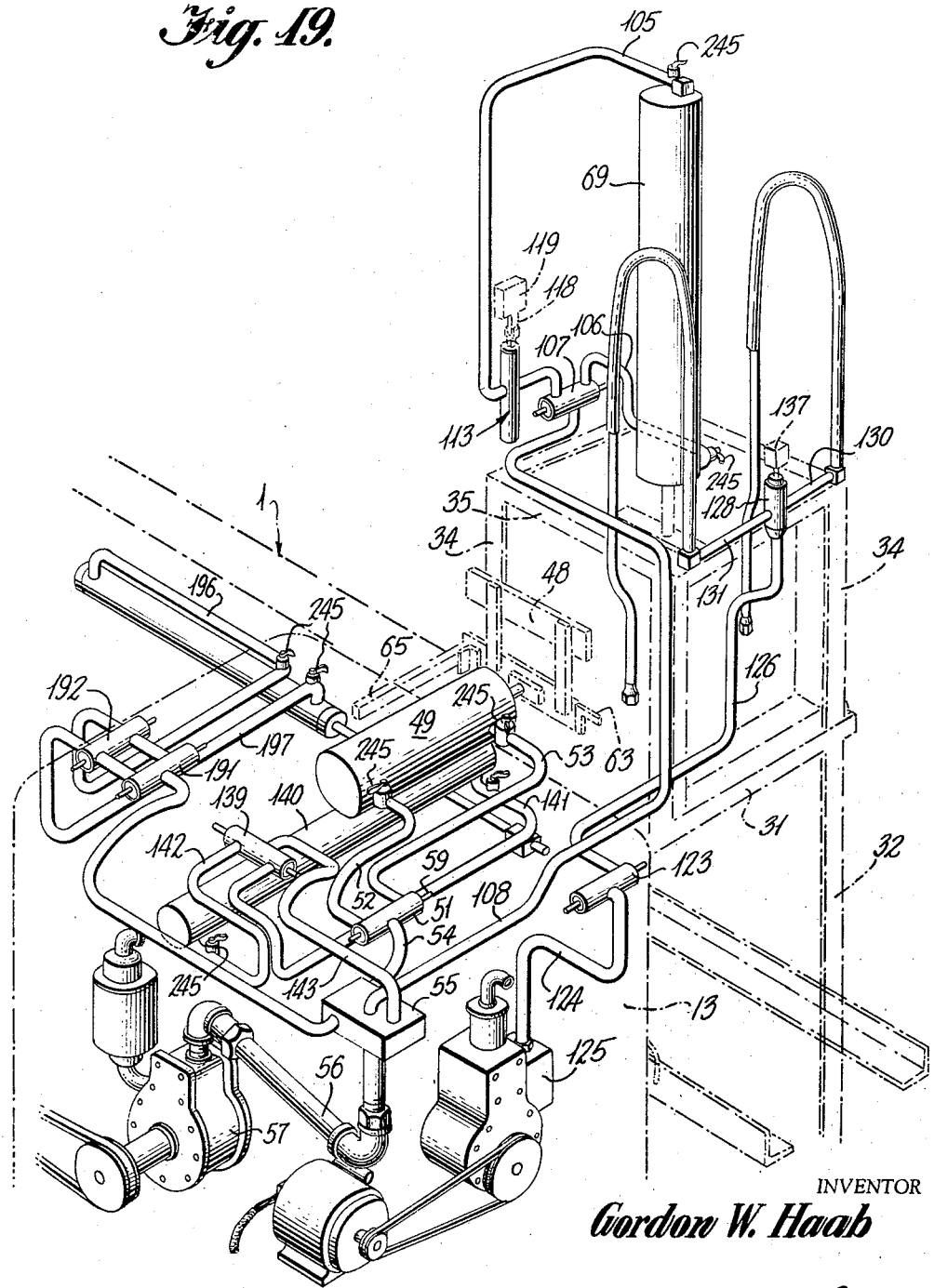
Figure 19 is a somewhat diagrammatic perspective view showing the various vacuum cylinders, their control valves and their connection to the several sources of vacuum.

Referring to the drawings in detail, there is shown a milk carton casing machine which is composed of a container supply feed means 1, transfer mechanism 2, a case handling unit 3 and a control unit 4. The transfer mechanism is divided into a horizontal transfer 5 and a vertical transfer unit 6. The case handling unit consists of a feed for cases 7, means 8 to position the cases properly on the machine, and means 9 for ejecting filled cases. In many dairies, a conveyor is used to transfer filled cartons for the filling machine to a casing station. This conveyor can supply cartons to the supply feed 1 of the machine. In some instances, the conveyor from the filling machine may be used as the supply feed line. Usually, a conveyor is used to transport cases to the loading station. This conveyor also may be utilized to bring cases to the machine of the present invention. Such a conveyor is shown in Figure 1 at 10. The conveyor may be trained over guide rollers 11 to drop it beneath the casing runway of the machine at the entrance end and over guide rollers 12 to bring it back to its former plane at the outlet end. Thus, it will serve to deliver cases to the machine and carry them away after ejection, as will be described.

The machine comprises three joined structural units, a main housing 13 which encloses and supports the operating pumps, motors and control system, the supply feed 1 which is at one side of the main housing, and the transfer unit which is also at one side of the main housing at right angles to the supply feed line.

The supply line is supported upon a frame which consists of a pair of spaced horizontal members 14, attached to the main housing 1 and projecting outwardly therefrom. They are held in proper spaced relation by suitable transverse spacers. Braces 15 extend diagonally downward from the frame members 14 and have their lower ends connected to the main housing to hold the frame members horizontally positioned. At the outer end of the frame, a sprocket 16 is mounted to guide the feed conveyor 17. The conveyor may be composed of a plurality of plates pivotally connected together. The main housing is cut away at its side and top, as at 18, to accommodate the conveyor and a second sprocket 19. The endless conveyor passes about the two sprockets 16 and 19 in conventional manner. Guide rails 20 are positioned on either side of the conveyor, above the top flight thereof, to hold cartons in single file on the conveyor as they enter the machine. The rails are mounted on brackets 21 secured to the frame members 14.

Sprocket 19 is mounted on a shaft 22 journalled in bearings 23 fixed to the main housing. Shaft 22 carries a second sprocket 24, around which a drive chain 25 passes. Chain 25 is driven by a sprocket 26 on the output shaft 27 of a combined motor and gear reducer 28.

When motor 28 is running, conveyor 17 will move carrying cartons 29 into the machine.

Conveyor 17 moves the cartons onto a dead plate 30 which is in the horizontal plane of the conveyor top flight and forms an extension of the carton feed path. As cartons leave the conveyor they are pushed across the dead plate by the friction which the conveyor exerts against the bottoms of succeeding cartons. Thus, the spaces between the cartons will be closed, and the cartons will be pushed across the dead plate in contact with one another. The dead plate is mounted upon a pair of spaced, parallel channels 31, attached to the main housing and extending outwardly therefrom at right angles to the supply feed path.

The channels 31 form the bottom members of the frame which supports the vertical transfer unit 6. The outer ends of the channels are supported upon legs 32, which are part of the case handling unit 3. The outer ends of channels 31 are bridged by a horizontal frame member 33. Corner posts 34 are secured to the channels 31 and extend vertically upward, being attached at their upper ends to a rectangular, horizontal frame 35. This completes the basic frame for the vertical transfer unit, and all of that transfer mechanism is supported upon this framework. Thus, by removing the bolt connections between the channels and the main frame and the channels and the legs 32 the entire vertical transfer mechanism can be removed as a unit.

As the cartons are moved across the dead plate, the lead carton is pressed against a pair of vertically spaced guides 36 which arrests the forward movement of cartons and align the lead carton for lateral transfer into an accumulating chamber 37. As the lead carton moves into contact with the guides 36 it also contacts and actuates, a micro switch 38 which is mounted upon a bracket 39 fixed to a side wall 40 of the accumulating chamber which, in turn is secured to the guides 36. Actuation of switch 38 activates a horizontal transfer mechanism, to be described, to remove the row of cartons on the dead plate into the accumulating chamber.

The accumulating chamber is U-shaped in a horizontal plane, located directly behind the dead plate 30 with the open side of the U toward the dead plate. The chamber is formed by the side wall 40, a side wall 41 and back wall 42. All of the walls are mounted upon brackets 43 which, in turn, are secured to the frame of the vertical transfer unit. Guide plates 44 are mounted upon the wall 41 and serve with guides 36 to lead a row of cartons into the chamber. It will be noted that wall 41 and guides 44 terminate at the edge of the dead plate, whereas wall 40 and guides 36 extend across the dead plate to form a stop for incoming cartons. The floor of the chamber is a retractable accumulating table 45, mounted for horizontal sliding movement upon rails 46 secured to the side flanges of the channels 31. The inner end of the accumulating table is located beneath the edge of dead plate 30 when the table is in its normal, carton-supporting, position. Strips 47 are fastened to the tops of channels 31 behind the dead plate to overlie the side edges of the table and form with the rails 46 trackways in which the table may slide.

The row of cartons is moved into the chamber between the guides 36 and 44 by means of the horizontal transfer mechanism 5. This consists of a transfer plate 48, which may be a solid vertically positioned plate on a skeleton plate as shown. The transfer plate is horizontally movable across the dead plate to push the gathered row of cartons on the dead plate onto the accumulating table. The transfer plate is moved by means of a vacuum operated piston and cylinder assembly 49. A piston rod 50 connects the piston to the transfer plate. Cylinder 49 is mounted upon the main housing 13.

Cylinder 49 has its opposite ends connected to a vacuum control valve 51 by means of pipe lines 52 and 53. A line 54 connects valve 51 to a vacuum header 55 located at one corner of the top of the main housing 13. A pipe line 56 leads from a vacuum pump 57, mounted in the housing 13, to the vacuum header 55.

The control valve 51 has a casing 58 which is tubular and drilled through its side walls to receive the pipes 52, 53 and 54. It will be noted that line 54 enters the tubular casing midway of its length, and lines 52 and 53 are equally spaced from the midpoint of the tube on opposite sides thereof. A sliding member within the casing serves to connect the line 54 to either the line 52 or the line 53 and permit the other line communicative to atmosphere. The sliding member consists of a shaft 59 on which is mounted a pair of plugs 60 having a close fit with the tubular casing 58. The plugs are spaced apart along the shaft a distance equal to the spacing between the ports to which the lines 52 and 53 are connected. It will be obvious that when the sliding member is moved in one direction line 52 will be connected to vacuum supply line 54 and line 53 will be open to atmosphere. When the sliding member is shifted in the opposite direction, line 53 is connected to the vacuum and line 52 is open to atmosphere.

The sliding member of control valve 51 is caused to move by a pair of solenoids 61 and 62 positioned at opposite ends of the shaft 59. As the lead carton moving over dead plate 30 presses micro switch 38, solenoid 62 is energized to move the sliding member of valve 51 to connect line 53 with line 54 to move the piston forward, to push the row of cartons from the dead plate into the accumulator. As soon as the cartons leave the dead plate, micro switch 38 is released, breaking the circuit to solenoid 62.

When the transfer plate 48 moves the row of cartons into the accumulating chamber a trip 63, carried by the transfer plate, contacts and closes a micro switch 64, mounted on the side wall 40 of the accumulating chamber, to energize solenoid 61 and reverse the position of valve 51 and return the transfer plate to its inactive position.

Transfer plate 48 carries a gate member 65 which moves with the plate to block off the supply feed line during the lateral transfer movement. The gate is attached to the transfer plate near the bottom and extends rearwardly. If desired, its back end may be supported by guide rollers carried by brackets 65' mounted on top of the main housing 13. As the transfer plate moves forwardly to move a row of cartons into the accumulating chamber the gate 65 is drawn across the carton feed path to hold back the cartons being fed into the machine until the transfer has been made and the transfer plate has returned to its position of rest.

The action of feeding the cartons onto the dead plate to form rows and transferring the rows laterally into the accumulating chamber is continued until the accumulating chamber is filled. Each row of cartons as it is moved into the accumulating chamber pushes ahead of it the rows which were previously transferred. As the last row is pushed into place the first row is moved into contact with the back wall of the accumulating chamber. As this occurs the cartons of this first row strike and actuate three micro switches 66, 67 and 68. As will be later described, actuation of these switches starts the movement of the vertical transfer mechanism, opens the circuit controlling the lateral transfer mechanism so that there can be no lateral transfer movement during the vertical transfer action, and sets up other circuits for future actuation.

The vertical transfer mechanism is operated by a piston and cylinder assembly 69 mounted upon the top of the vertical transfer frame and extending vertically from the center of the frame. A piston rod 70 is connected to the piston and carries a cross head 71. The transfer carriage 72 is mounted upon the cross head for floating action. The transfer carriage consists of a horizontally positioned plate 73 having a plurality of vacuum manifolds 74 mounted upon its upper surface. These are equally spaced laterally of the plate and extend the full length thereof. As shown, there are four manifolds on the plate and these are divided into two groups 75 and 76. The manifolds of each group are interconnected by means of pipes 77 extending between the manifolds near the ends thereof. By this division, vacuum can be applied in a more nearly equal manner throughout the manifold system. Each manifold is provided with a plurality of openings 78 equally spaced along its bottom and these openings communicate with openings 79 in the plate 73. Openings 79 are tapped to receive the threaded ends of nipples 80 which secure vacuum cups 81 to the underside of the plate 73. Thus the vacuum cups will be arranged in rows along the underside of the transfer carriage. These rows are spaced equi-distant to the rows of cartons in the accumulating chamber and there will be one vacuum cup for each carton in each row. Plate 73 is drilled near either end midway between the side edges and vertical shafts 82 are mounted to extend upwardly from the plate. These shafts pass through openings 83 near the ends of the cross head 71 and have their upper ends attached to a bracket 84 above the cross head. Bracket 84 has a central opening 85 to permit the piston rod 70 to slide through it. By this arrangement the transfer carriage will hang from the cross head and, when downward movement of the carriage is arrested by contact with the tops of cartons in the accumulating chamber, the piston and the cross head can continue to move downwardly. This mounting also permits the carriage some freedom of movement so that it can find its seat upon the carton tops. If one or more of the suction cups should fail to obtain a grip upon the cartons the crosshead is free to move downwardly into contact with the back of the plate and press the cups into engagement with the carton tops so that a seal will be made. The cross head is guided in its downward movement by means of vertical guide shafts 86 and 87. Shafts 86 and 87 are guided in bearings 88 and 89 carried by the top of the vertical transfer frame.

Guide shaft 86 carries at its top a micro trip 90 and guide shaft 87 carries a similar micro trip 91. Micro trip 90 is in engagement with a micro switch 92 when the carriage is in its uppermost position. This trip also engages a micro switch 94, when in this position, holding these two switches closed. As soon as the carriage begins to move downwardly these switches are released, breaking certain circuits which will be described. A micro switch 93 is positioned just below micro trip 91 when the carriage is in the upper position and as the carriage begins to move downwardly the micro trip engages and then releases this switch. This will momentarily energize the circuit, as will be described. Micro switch 93 is mounted upon a post 95 which is fixed to the vertical transfer frame and micro switches 92 and 94 are mounted upon a post 96 also supported upon the frame. Post 96 also carries a micro switch 97 spaced downwardly from the switches 92 and 94 and this switch is momentarily energized then released as the transfer carriage moves downwardly. At the bottom of the post 96 there are two other micro switches 98 and 99. These two switches are contacted when the transfer carriage is at the bottom of its stroke and initiate further actions as will be described. The post 95 carries a micro switch 100 substantially at the level of the switches 98 and 99 and trip 91 will actuate this switch as the carriage reaches its lowermost position. An additional micro trip 101 is supported on the bracket 84 for movement with the floating transfer carriage and this trip has an elongated cam face 102 for contact with a micro switch 103 which is mounted in a channel 104 fixed to the side wall of the accumulating chamber.

The lowering and raising of the transfer carriage is accomplished by means of vacuum which is led to opposite ends of the cylinder 69 by means of pipe lines 105 and 106. The pipe lines 105 and 106 connect to the ports of a control valve 107 mounted on the top of the vertical transfer frame. This valve is identical to the valve 51 previously described. Line 108 is connected into the opposite side of the control valve and leads from the vacuum header 55. It will be understood that operation of the valve 107 alternately connects the top and bottom of the cylinder 69. The control valve 107 is operated by means of solenoids 109 and 110. The circuits and switches controlling the operation of these solenoids will be described later. Solenoid 110 is positioned so that its armature 111 contacts and holds closed a micro switch 112 when the solenoid is in its inoperative position. It is contemplated that piston 69 will be used as a dash pot to arrest the downward movement of the transfer carriage as the cartons near the bottom of the case and permit the carriage and cartons to settle slowly into place. To accomplish this a choke valve 113 is interposed in the vacuum line 105. This valve consists of an outer casing 114 having ports at its opposite sides to which the ends of the line 105 are connected. There is a plunger 115 within the casing having a port 116 through it, which port is of sufficient size so as not to restrict the flow of air through the line 105 when this port is in registry with that line. The plunger has a second port 117 below the first mentioned port which is of much smaller cross section so that when the plunger is drawn upward and the port 117 connects the ends of the line 105 the flow of air will be materially reduced. The plunger is connected to the armature 118 of a solenoid 119. When the solenoid is energized its armature moves upwardly lifting the plunger in the valve and restricting the flow of air through the line 105.

It was previously mentioned that when a load or layer of cartons have been moved into the accumulating chamber the vertical transfer carriage moved downwardly and the vacuum cups 81 make contact with the tops of the cartons. Just prior to the seating of the cups on the tops of the cartons a plunger 120 carried by the transfer carriage strikes the top of the carton beneath it and is moved by the continued downward movement of the transfer carriage. The plunger is slidably mounted in the carriage plate and, when it is raised by contact with a carton, it actuates a micro switch 121 which is also carried by the transfer carriage. This closes a circuit, which will be described, energizing a solenoid 122 which moves the sliding member of a control valve 123 mounted on top of the main casing 13. This serves to connect a line 124, which runs from a vacuum pump 125 within the housing 13, with a line 126 which extends from the valve 123 to a distributing chamber 127 within the base of a switch actuating valve 128. Valve 128 has a casing 129 with the distributing chamber in the bottom and two ports communicating with this chamber, to which the vacuum lines 130 and 131 are connected. The lines 130 and 131 connect respectively to the front and rear vacuum manifolds mounted upon the carriage plate 73. The closing of micro switch 121 will operate solenoid 122 to connect the vacuum pump 125 to the suction cups.

The switch actuating valve 128 has an upper bore 132 to receive the stem 133 of a piston 134. The piston is mounted in an enlarged bore at the top of the casing 129. A spring 135 surrounds the stem 133 and bears against the underside of the piston and upon the shoulder formed at the juncture of the stem-receiving bore 132 and the enlarged upper bore in which the piston slides. This forces the piston outwardly against a cap 136 which closes the top of the casing and forms a limit stop for the piston. The vacuum being drawn in the vacuum cups flows through the ports in the bottom of the casing as it is being pulled by the vacuum pump. This vacuum is exerted against the bottom of the stem in the valve. The spring 135 is of such strength that it cannot be overcome and the piston moved downwardly until the full vacuum is on the line. Thus if any one or more of the vacuum cups do not have a perfect seal upon the containers the piston will not be drawn downwardly. When a complete seal has been made, the piston will move and actuate a micro switch 137 which is mounted above the valve casing and controlled by a contact member 138 fixed to the top of piston 134 and bearing against the switch to hold it open. The closing of this switch serves to reverse control valve 107 to start the vertical transfer piston on its upward stroke, raising the carriage. At the same time, it closes a circuit to operate a control valve 139 which controls the vacuum flow to a piston and cylinder assembly 140 which retracts the accumulating table 45.

Control valve 139 is connected by a vacuum line 141 to the front of the cylinder 140 and a vacuum line 142 to the back of cylinder 140. A third line 143 connects the control valve with the vacuum header 55. Valve 139 is identical to the valves 51, 107, 123 and 139. This valve is operated by the solenoids 144 and 145. A piston rod 146 connects the piston of the cylinder assembly 140 to the accumulating table 45. The flow of vacuum to this cylinder is so adjusted that it will have insufficient force to retract the table when the weight of the cartons and the carriage is upon it. Even though this table operating mechanism is actuated prior to the lifting of the cartons it will not move until the carriage lifts the cartons slightly from the table. The table will then be drawn quickly from beneath the accumulating chamber.

As the accumulating table reaches its full retracted position its back edge strikes the protruding ends of a pair of guide rods 147 which are slidably mounted on a bar 148 fixed upon the top of the main housing 13. These rods are connected at their back ends to a strip 149. The strip has a central opening 150 which receives a rod 151 which is also attached to the bar 148. Rod 41 has a head 152 at its outer end and a coil spring 153 is mounted on the rod and normally presses the strip into contact with the bar. As the table is retracted it strikes the ends of the guide rods pushing them rearwardly and thus moving strip 149. The strip contacts a micro switch 154 which reverses the position of the control valve 107 and again starts the vertical transfer piston in a downward direction to lower the cartons into a case. At the same time it actuates the choke valve 113 to restrict the flow of air to the upper end of the vertical transfer cylinder to check the downward movement of the carriage as mentioned above and as will be described in detail later.

The cartons are lowered into the case in position on the case handling unit 3 and the transfer carriage returns to its upper inoperative position. If the case is filled it will be ejected from the machine. During the filling operation the case occupied a position immediately beneath the accumulating chamber on a case runway 155. This runway is formed by a pair of spaced angle members 156 which form the actual track upon which the cases slide. The angle members are mounted upon channels 157 which are connected to the main housing 13 and the legs 32 of the case handling frame. The case being loaded is held in position longitudinally of the case runway by being held against a case stop 158. The case stop is in the form of a pin slidable longitudinally in a guide groove 159 in a guide block 160 mounted on the back of the main housing 13. The outer edge of the block lies in the same vertical plane as the flange of the inner angle member of the case runway and the case stop moves in and out of the guide block to limit the movement of a case or to permit the case to be moved along the runway. The guide is operated by means of a cam plate 161 which has an inclined cam slot 162. A small roller 163 is mounted on the top of the case stop and rides in the cam slot 162. The cam plate is connected by means of a rod 164 to a case stop actuating lever 165. Lever 165 is pivotally mounted upon the main housing as at 166. Although the case stop is positioned so as to be contacted by the leading edge of a case moving into position beneath the accumulating chamber the actuating lever 165 is located at a position which will be behind a case in loading position and adjacent the case ejecting mechanism. The case stop actuating lever is operated by the case ejecting mechanism and the case stop is tripped to permit free movement of the case before the case ejector contacts the case during its ejecting movement. When the ejector mechanism returns to its inactive position it re-sets the stop and locks the lever in that position.

Directly below the case stop there is an opening 167 in the vertical flange of the inner angle member 156 of the case runway to permit a roller 168 to project into the runway. This roller is carried by a micro switch 169 which must be closed in order for the transfer mechanisms to operate. This insures against operation of the machine when there is no case in position to be loaded. As the case moves into position it bears against the rollers 168 and closes switch 169. The case is held tightly against the back rail 156 by means of a case positioner 170. The positioner is in the form of a bell crank 171 pivotally mounted at its center upon a bolt 172 fixed to bracket 173 secured to the vertical flange of the front angle member 156. The bell crank 171 carries rollers 174 and 175 at its ends. These rollers are adapted to contact the sides of the case as it moves into loading position and to press the case firmly against the back rail of the runway. That arm of the bell crank which carries the roller 174, that is, the arm nearer the leading end of the case, is biased by means of a spring 176 which bears against the arm and is anchored in a plate 177 fixed to the front rail 156. This normally holds the case positioner tilted so that the arm of the bell crank carrying the roller 175 is out of the way of incoming cases and the arm carrying the roller 174 extends into the case path. As the case moves into position it will contact the roller 174 and rock the bell crank, bringing both rollers to bear against the side of the case and force the case tightly against the back rail 156. This will depress roller 168 and close micro switch 169. In order to maintain sufficient pressure upon the cases to hold them tightly against the back rail even though there may be slight width variation between the adjacent cases, the bell crank is split as at 178 from its inner edge to the opening through which the pivot bolt 172 passes so that the arms of the bell crank can flex in the manner of a leaf spring.

It will be noted that a deflector plate 179 is mounted upon the vertical flange of the back rail 156 to engage the front corner of incoming cases and move them outwardly toward the front rail. As the trailing edge of the case passes this deflector plate the case positioner will contact the side of the case and force it rearwardly as described. This will move the incoming cases outwardly so that they will not contact the ejector mechanism as they move into position and at the same time will position the case immediately behind the one at the loading station offset with respect to the case at the loading station. By reason of this the roller 175 will serve as a stop to prevent another case from entering until the loaded case has been entirely ejected from the machine. When the loaded case moves out of the path of the case positioner, spring 176 will rock the bell crank moving roller 175 out of the path of the incoming case and the force of cases being advanced on the case conveyor will push that case into loading position.

The case ejector 9 consists of a carriage 180 horizontally movable along one side of the case runway and having a case ejecting arm projecting over the runway to contact the rear wall of a case and push it out of the machine. The case ejecting arm is pivotally mounted upon the carriage 180 as at 183 and is biased by a spring 184 into operative position projecting over the runway. The stop 185 is provided on the carriage to limit the movement of the arm and hold it in proper position. The arm is pivoted so that if it should fail to reach its position of rest on its return stroke prior to the entry of a case into loading position the arm can rock about its pivot until it has gotten beyond the case at which time the spring 184 will swing the arm into operative position against the stop 185 and hold it there. The carriage 180 is connected by a bracket 186 to a piston rod 187 connected to the piston of a piston and cylinder assembly 188. The piston and cylinder assembly 188 is mounted at one side of the main housing 13 and the piston rod 187 extends through an opening in the housing and along the inner wall of the housing. The bracket 186 which connects the ejecting carriage to the piston rod moves in a horizontal slot 190 in the front wall of the main housing. Movement of the piston within the cylinder is controlled by means of a control valve 191 and a vacuum cut-off valve 192. Control valve 191 is identical to the control valves previously described and is actuated by means of solenoids 193 and 194. A line 195 connects the valve 191 to the header 55. The cut-off valve 192 is mounted across the vacuum line 196 from valve 191 to the outer end of cylinder 188 and line 197 from the valve to the inner end of cylinder 188. The cut-off valve consists of a cylindrical casing 198 and a slidable core member 199 which carries two spaced plugs 200 which can be moved to block the lines 196 and 197 or to open them for free passage of air or vacuum as the case may be. The sliding member of valve 192 is operated by means of solenoids 210 and 211.

As the ejector starts its operative movement, a micro trip 212 carried by the ejector bracket 186 moves away from a micro switch 213 allowing that switch to open so that there can be no further movement of the two transfer mechanisms. When the ejector reaches the limit of its operative stroke micro trip 212 contacts and closes a micro switch 214 mounted within the main housing. This serves to reverse the movement of the ejector and bring it back to its inoperative position.

The operation of the vertical transfer mechanism in picking up the cartons from the retractable accumulating table and then lowering them into a case after the table has been retracted has been described. As the carriage reaches its bottom position and the piston continues to move downwardly micro trip 90 will contact and close micro switch 99 which energizes a solenoid 215 to reverse the control valve 123. It will be noted that valve 123 is slightly different from the other valves in that it has only one inlet line 124 and a single outlet line 125 which is staggered with respect to the inlet line. The slidable inner member 216 is so arranged that in one position it places the two lines in communication with one another and in the other position cuts off the vacuum line 124 from the pump and opens line 126 to atmosphere to break the suction to the vacuum cups and release their hold on the cartons. When the transfer carriage reaches its uppermost position the accumulating table moves back to carton supporting position. During this movement it strikes and closes a micro switch 217 which is in the circuit controlling the lateral transfer movement so that lateral transfer can again take place. As the vertical transfer mechanism continues its upward movement micro trip 91 closes micro switch 93 to energize solenoid 145 and reverse control valve 139 which controls the reciprocating table. As solenoid 145 is actuated its armature breaks contact with a micro switch 218 which has been held closed prior to this time.

The structure as described above is capable of operation with flat top milk cartons as described or with any other articles or containers which have flat or substantially flat tops so that the vacuum cups can seal upon them. If it is desired to handle articles having different top shapes it is only necessary to replace the vertical transfer carriage plate 73. A substitute carriage plate 219 for use with milk cartons having their side walls brought together at the top and sealed so that the top surfaces are inclined is shown in Figure 21. The nipples 220 attaching vacuum cups 221 to the plate are angular in shape so that the vacuum cups have their open faces arranged at substantially the angle of the side walls of the container 22. In this case a pair of vacuum cups will be used to grip each container. It will be obvious that the same operation previously described will function to create a perfect seal. If the seal is not made by the weight of the carriage plate the cross head of the piston will press upon the carriage plate and force the vacuum cups into sealing contact with the walls of the container. Similar modifications of the vacuum cup arrangement may be made for articles of different shape.

Figure 20 of the drawings shows a diagram illustrating the manner in which the various electrical elements of the machine are connected. The three wires of a conventional 220-volt line with the wires 223 and 224 representing respectively the 220 and 110-volt lines and the wire 225 being the common return line are shown.

The motor 28 is shown as connected across the 110-volt circuit by means of wires 226 and 227.

The vacuum pumps 57 and 125 are connected across the 220-volt line by means of the wires 228 and 229. All of the solenoids and micro switches are connected across the 110-volt line. Solenoid 109 is connected in series with micro switch 98 by line 230. It is also connected in series by line 231 with one side of the micro switch 154 which line also includes the normally open micro switches 218, 68 and 121. The latter two switches are in series with the solenoid 122 by means of the line 232. A branch line 233 from the line 232, which includes the switches 218 and the two sides of switch 154, connects the solenoid 110 in series. A branch line 234 from the wire 233 places solenoid 110 in series with switches 92 and 66. Solenoid 62 is connected in series by the wire 235 with the normally open switches 169, 213, 94, 217 and 38 and the normally closed micro switch 67. Solenoid 144 is connected in series by the line 236 with micro switch 137. Branch line 237 from the line 236 places the solenoid 119 in series with the micro switches 112 and 137. Wire 238 bridges the 110-volt line and includes the solenoid 145 and the switch 93. Wire 239 connects solenoid 215 and micro switch 99. The wire 240 is connected to micro switch 64 and solenoid 61. A branch wire 241 connects the solenoid 210 with the switch 64 so that both solenoids 61 and 210 are under control of the switch 64. The wire 242 connects solenoid 194 with switch 97. Wire 243 connects solenoid 211 in series with the normally open micro switches 100 and 103. Wire 244 bridges the 110-volt line and interconnects solenoid 193 with micro switch 214.

In operation of the machine milk cartons are fed to the conveyor 17 by any appropriate means such as the conveyor which removes filled containers from the filling machine. The cartons are carried by conveyor 17 into the present machine and deposited on the dead plate 30. As the cartons reach the dead plate the space between them is closed and cartons being fed by the conveyor push those on the dead plate across the plate until they reach the far end. At this time a predetermined number of cartons will be upon the dead plate which number will form a row when the cartons are cased.

As the lead carton reaches the far end of the dead plate it will be pressed against and close micro switch 38 which will close a circuit to the solenoid 62. The circuit through micro switch 38 can not be completed unless micro switches 217, 67, 94, 213 and 169 are closed. In order for these micro switches to be closed the accumulating table has to be in its closed position which compresses micro switch 217. The micro switch 67 is normally closed unless there are cartons in the accumulating chamber and pressing against it. The vertical transfer mechanism has to be in its upper position. The case ejector must be in its position of rest and a case has to be in loading position closing micro switch 169.

As solenoid 62 is energized it operates control valve 51 to connect pipe line 53 with pipe line 54 leading from the vacuum header 55. This puts vacuum at the front end of cylinder 49 and permits pipe 52 to be open to atmosphere. This will cause the piston to move forward and the transfer plate 48 to push the row of cartons on the dead plate to the back edge of the dead plate toward the accumulating chamber. As the cartons move forward the micro switch 38 is released, breaking the circuit to solenoid 62. As the transfer plate moves forward the carton retaining gate 65 moves across the supply path preventing additional cartons from moving onto the dead plate. As the transfer plate 48 approaches its limit of travel micro trip 63 which is carried by the plate strikes and actuates micro switch 64. This energizes solenoid 61 which reverses the position of the control valve 51 to retract the transfer plate. As the transfer plate moves rearwardly micro switch 64 opens, breaking the circuit to solenoid 61. When the transfer plate reaches its fully retracted position cartons can again move upon the dead plate as before. The cycle is repeated until a predetermined number of rows of cartons have been moved into the accumulating chamber.

Each row of cartons as it is moved into the accumulating chamber pushes the previous row ahead of it across the accumulating table 45. When the first row of cartons reaches the back of the accumulating table the cartons strike the micro switches 66, 67 and 68. Micro switch 67 is a normally closed switch and it is opened by this contact and prevents the lateral transfer mechanism from operating. Micro switch 66 is closed and completes a circuit to micro switch 92 which is closed so long as the vertical transfer mechanism is in its raised position which is the position it occupies at the time. Thus a circuit is closed to solenoid 110 which reverses the position of control valve 107 to connect the bottom of cylinder 69 with the vacuum line and the line leading to the top of cylinder 69 to atmosphere. This will start downward movement of the vertical transfer mechanism. Micro switch 68 is included in the circuit controlling solenoid 122 but no action takes place at this time as micro switch 121 is open.

As the vertical transfer mechanism begins to move downwardly micro trip 90 on vertical guide shaft 86 moves downwardly, breaking the circuit through micro switch 94 which opens the lateral transfer mechanism circuit. At the same time, micro trip 90 leaves micro switch 92 which is in circuit with solenoid 110, which is one of the solenoids controlling the operation of the vertical transfer control valve 107. So long as the vertical transfer mechanism is out of its top position, both of the above circuits are broken. When the micro trip 91 moved downwardly it compressed and almost immediately released micro switch 93. This gives a momentary impulse to solenoid 145 but no action takes place, unless the armature of the solenoid has been accidentally moved by the operator, as the armature is already in operative position. The transfer mechanism continues to move downwardly until the vacuum cups 81 carried by the vertical transfer carriage 72 contact the top of the cartons in the accumulating chamber. As this occurs the plunger 115 carried by the carriage 72 has been moved upwardly, closing micro switch 121. This closes a circuit which includes the micro switch 68, which was previously closed when the cartons contacted the back of the accumulating chamber, and energizes solenoid 122 to reverse control valve 123, placing the vacuum lines to the vacuum cups in communication with the vacuum pump. This energizes micro switch 318, which is in the open position, for a future operation. When the vacuum cups contact the tops of the cartons the transfer carriage stops, but the piston continues its downward movement carrying with it the cross head 71.

Under normal conditions the vacuum cups will make a seal with the carton tops almost immediately and the direction of piston travel will be reversed. In the event that the seal is not made immediately, however, the downward movement of the piston and cross head will continue until the cross head contacts the top of the transfer carriage plate 73 pressing the cups tightly against the cartons so as to effect a seal. As soon as the vacuum cups have sealed, full vacuum will be exerted all through the vacuum line and the spring 135 in switch actuating valve 128 will be overcome and the piston in that valve will move downwardly under the pull of the vacuum, thus actuating micro switch 137. It will be understood that until the seal is complete and the full vacuum is on the line, micro switch 137 will not be actuated. This acts as a safety measure to prevent further operation of the machine if there is an imperfect gripping between one of the vacuum cups and a carton. In other words, a positive grip must be had on all of the cartons before further operation of the machine can take place.

Closing micro switch 137 energizes solenoid 144. This reverses control valve 139 coupling the vacuum source with the back end of piston 140 for retracting the accumulating table 45. Piston 140 is designed to have only sufficient power to retract the unloaded table. The weight of the cartons and transfer carriage upon the table makes it impossible for this piston to act to retract the table. When solenoid 144 is actuated, solenoid 145 is moved so that its armature goes back to its inoperative position. This causes the armature to close micro switch 218. This completes a circuit to micro switch 154 which is normally closed and to solenoid 109 which reverses the position of control valve 107 so that the vertical transfer piston will begin to lift. It also completes a circuit to micro switch 112. This circuit is broken at this point by the armature of solenoid 110. As soon as the weight is moved off of the retracting table the piston 140 draws it from beneath the accumulating chamber. When the table reaches its fully retracted position, it closes micro switch 154. This breaks the circuit to solenoid 109 and at the same time completes a circuit to solenoid 110, reversing control valve 107 which causes piston 69 to begin to lower the carriage. At the time solenoid 110 is energized it releases micro switch 112 which completes a circuit through solenoid 119, raising the plunger of choke valve 113 to restrict the flow of air to the top of the cylinder 69. The carriage plus the weight of the cartons would be sufficient to cause the piston to be carried down rapidly drawing a vacuum in the top of cylinder 69. A vacuum sufficiently strong to arrest the downward movement of the carriage will be built up just prior to the time the cartons reach the bottom of the case. Sufficient air will enter the top of cylinder 69 through the small orifice 117 in the valve 113 to lower the cartons very slowly for the remaining distance and deposit them gently upon the bottom of the case.

As the carriage moves downwardly micro trip 90 closes and quickly releases micro switch 97, energizing solenoid 194 to reverse the position of control valve 191. No action takes place as a result of this, however, as control valve 192 is in closed position. Thus there will be movement of the case-ejecting mechanism until a later time.

As the cartons move downwardly out of the accumluating chamber their pressure upon the micro switches 66, 67 and 68 is released and micro switch 68 opens, breaking the circuit to solenoid 122. This also breaks the circuit through solenoid 110. When micro switch 66 opens it also breaks the other line leading to solenoid 110. It is to be remembered that micro switch 67 is a normally closed switch and when the pressure of the cartons is removed it closes but the circuit in which it is included is broken in other places so no action takes place.

If the cartons being handled are of quart size a single layer will fill the case. In this event micro trip 101 will be in contact with micro switch 103 but the circuit through solenoid 211 is not complete as micro switch 100 is still open. As the vertical transfer piston continues downward it carries with it the guide shafts 86 and 87. When the trips 90 and 91 carried by these shafts are at a low enough level they close micro switches 98, 99 and 100. Closing micro switch 99 completes a circuit to solenoid 215 which reverses the control valve 123 and cuts the vacuum to the vacuum cups to release the cartons from them. When the vacuum is broken the piston of switch actuating valve 128 is released and the spring draws it back to its inoperative position, opening switch 137 and thus breaking the circuit to solenoid 119. This permits choke valve 113 to return to its former position where it does not obstruct the passage of air through the line to the top of the vertical transfer cylinder. When micro switch 98 is closed it completes a circuit to solenoid 109, again reversing the control valve 107 to raise the transfer carriage. When solenoid 109 is energized it moves the armature of solenoid 110 which opens micro switch 112, but this has no effect on the operation at this point as the line in which switch 112 is included is already broken. Closing micro switch 100 completes a circuit to solenoid 211 which opens control valve 192. At the same time control valve 191 is reversed to hold the ejector mechanism against movement while the vertical transfer carriage is within the case. The transfer carriage continues upwardly and as soon as it has cleared the case micro trip 90 closes micro switch 97. It holds the switch closed but a short time and then permits it to open. While the switch is closed solenoid 194 is energized. It again reverses control valve 191 causing the ejector piston to move and eject the filled case. As the ejector mechanism moves forwardly micro trip 212 releases micro switch 213, breaking the circuit to micro switch 38 holding the lateral transfer mechanism out of operation. The ejector mechanism is designed to have a limited free movement before contacting the case to be ejected and during this movement it rocks the lever 165 withdrawing the case stop 158 from in front of the case. The ejector then continues its movement and pushes the case from the machine. As it reaches the limit of its travel micro trip 212 contacts and closes micro switch 214. This energizes solenoid 193 to reverse control valve 191 to bring the case ejector back to its starting position. As the ejector moves back to position it releases micro switch 214, thus breaking the circuit to solenoid 193. When it reaches its starting position micro trip 212 again depresses and closes micro switch 213. As soon as the case has been ejected the case positioner 170 rocks about its pivot under the influence of spring 176, allowing another case to move into loading position. In the event the ejector mechanism has not reached its fully retracted position the ejector will strike the case and swing about its pivot. When it has passed the case on its return movement, the spring will cause the ejector arm to move back into operative position. As the ejector reaches its position of rest it will rock the case stop control lever back to upright position to project the case stop.

During this operation, the vertical transfer carriage is still moving upwardly and micro trip 91 will momentarily close micro switch 93, energizing solenoid 145 and reversing control valve 139. This causes piston 140 to move forward, returning the accumulating table to its position in the accumulating chamber. When the table is in position it again closes micro switch 215. When the vertical transfer assembly reaches its upper position, micro trip 90 again closes micro switches 94 and 92.

When the transfer carriage has reached its upper position, the case ejector is back in place, a new case is in position and has closed microswitch 169. The accumulating table is in carton-receiving position and a new cycle starts immediately as cartons are already in position on the dead plate depressing micro switch 38. Piston 49 will push these cartons onto the accumulating table and close micro switch 64. This reverses the direction of piston travel and at the same time energizes solenoid 210, closing control valve 192 and thus rendering the ejecting mechanism inactive until another case is full.

Whenever the vertical transfer carriage has lowered cartons into a case and the cartons are of less height than quart size cartons, micro trip 101 will have passed micro switch 103 so that when micro trip 91 contacts micro switch 100 there will be no ejecting action. Thus the cycle will be repeated as many times as is necessary to build up the load in the case to fill it. This will require two layers in the case of pints and three layers when half pints are being packed. As soon as the case is filled, however, the carriage will be in proper position to hold micro trip 101 in contact with micro switch 103 so that the proper circuits may be closed to actuate the ejecting mechanism.

The machine will operate quite smoothly, and is designed to operate within reasonable tolerances so that it will not become jammed or inoperative if certain of the material being handled or the cases should not be standard size. All of the various piston and cylinder assemblies are adjustable so that their pulling forces can be changed as may be required and their speed of operation may be altered. This is accomplished by means of valves 245 which are in the various vacuum lines controlling the respective cylinders.

While in the above one practical embodiment of the invention has been disclosed, it will be understood that the specific structural details described and shown are merely by way of illustration and the invention may take other forms within the scope of the appended claims.

What is claimed is:

1. A casing machine comprising, conveyor means to feed a continuous supply of articles to be cased to said machine, an accumulating chamber offset laterally from the feed path of said conveyor means, a retractable table forming a bottom for said accumulating chamber, means to move articles fed into said machine laterally into said accumulating chamber and upon said retractable table to assemble a case layer, vertical transfer mechanism mounted above said accumulating chamber, said vertical transfer mechanism including a transfer carriage movable into said accumulating chamber and through said accumulating chamber when said retractable table has been retracted, case supporting means mounted beneath said accumulating chamber, vacuum article-gripping means carried by said transfer carriage, a source of vacuum, and means operable by contact of said transfer carriage with articles in said accumulating chamber to couple said vacuum grippers to said source of vacuum.

2. In a casing machine as claimed in claim 1, vacuum means to operate said means to move articles laterally, vacuum means to shift said retractable table, and vacuum means to move said vertical transfer mechanism.

3. In a casing machine, means to feed a continuous supply of articles to be cased to said machine, an accumulating table offset laterally from the feed path of said feeding means, means to move articles fed into said machine laterally onto said accumulating table, a transfer carriage mounted above said accumulating table for vertical movement, means to lower and raise said transfer carriage toward and from said accumulating table, vacuum cups mounted on the underside of said transfer carriage for engagement with articles on said accumulating table, a vacuum pump, a pipe line from said vacuum pump to said vacuum cups, and means in said pipe line responsive to a predetermined vacuum force in said pipe line to initiate lifting movement of said means to raise said transfer carriage.

4. In a casing machine, means to feed a continuous supply of articles to be cased to said machine, an accumulating table offset laterally from the feed path of said feeding means, means to move articles fed into said machine laterally onto said accumulating table, a transfer carriage mounted above said accumulating table for vertical movement, means to lower and raise said transfer carriage toward and from said accumulating table, vacuum cups mounted on the underside of said transfer carriage for engagement with articles on said accumulating table, a vacuum pump, a pipe line from said vacuum pump to said vacuum cups, and means in said pipe line responsive to a predetermined vacuum force in said pipe line to initiate lifting movement of said means to raise said transfer carriage, said means to raise and lower said transfer carriage comprising a cylinder and piston assembly, said transfer carriage being connected to the piston of the piston assembly, a vacuum source, means to connect the top and bottom of said cylinder alternately to said vacuum source and atmosphere, said vacuum responsive means comprising a body in said pipe line having a bore in communication with the vacuum in said line, a core member movable in said bore and subject to said vacuum, means to bias said core away from the pull of said vacuum, and means activated by movement of said core to actuate said means to connect the top of said cylinder to said vacuum source.

5. In a casing machine, means to feed a continuous supply of articles to be cased to said machine, an accumulating table offset laterally from the feed path of said feeding means, means to move articles fed into said machine laterally onto said accumulating table, a transfer carriage mounted above said accumulating table for vertical movement, means to lower and raise said transfer carriage toward and from said accumulating table, vacuum cups mounted on the underside of said transfer carriage for engagement with articles on said accumulating table, a vacuum pump, a pipe line from said vacuum pump to said vacuum cups, means in said pipe line responsive to a predetermined vacuum force in said pipe line to initiate lifting movement of said means to raise said transfer carriage, means in said pipe line to control flow therethrough, and means operable by contact of said transfer carriage with articles on said table to operate said flow control means to couple said vacuum cups to said vacuum pump.

6. In a casing machine, a retractable accumulating table, means to supply articles to be cased to said table, means to support a case in position below said table, a piston and cylinder assembly mounted above said table, a transfer carriage connected to said piston for movement toward and from said table, a source of vacuum, pipes interconnecting said vacuum source and the top and bottom of said cylinder, means in said pipes to control air flow through said pipes to alternately connect the top and bottom of said cylinder to said vacuum source and atmosphere, and means in the pipe leading to the top of said cylinder to restrict the free flow of air to the top of said cylinder during the downward movement of said piston to cushion the lowering of articles in a case supported on said case support.

7. In a casing machine, a retractable accumulating table, means to supply articles to be cased to said table, means to support a case in position below said table, a piston and cylinder assembly mounted above said table, a transfer carriage connected to said piston for movement toward and from said table, a source of vacuum, pipes interconnecting said vacuum source and the top and bottom of said cylinder, means in said pipes to control air flow through said pipes to alternately connect the top and bottom of said cylinder to said vacuum source and atmosphere, and means in the pipe leading to the top of said cylinder to restrict the free flow of air to the top of said cylinder during the downward movement of said piston to cushion the lowering of articles in a case supported on said case support, said flow restricting means comprising a body having transversely opposed ports coupled in said line to the top of said cylinder, a plunger having an orifice of at least the cross-sectional area of said ports and an orifice spaced from the first said orifice of smaller cross-section than said ports, said plunger being movable in said body to selectively bring said orifices in registry with said ports.

8. In a casing machine, a retractable accumulating table, means to supply articles to be cased to said table, means to support a case in position below said accumulating table, a piston and cylinder assembly mounted above said table, a transfer carriage connected to said piston, a source of vacuum supply, pipe lines interconnecting the top and bottom of said cylinder and said vacuum source, a flow control valve in said lines selectively operable to alternately connect the top and bottom of said cylinder to said vacuum source, vacuum cups mounted on the underside of said transfer carriage, a vacuum pump, a pipe line connecting said vacuum pump and said vacuum cups, a flow control valve in said vacuum cup pipe line, and means operable by contact of said transfer carriage with articles on said table to actuate said flow control valve to couple said vacuum cups to said vacuum pump.

9. In a casing machine, a retractable accumulating table, means to supply articles to be cased to said table, means to support a case in position below said accumulating table, a piston and cylinder assembly mounted above said table, a transfer carriage connected to said piston, a source of vacuum supply, pipe lines interconnecting the top and bottom of said cylinder and said vacuum source, a flow control valve in said lines selectively operable to alternately connect the top and bottom of said cylinder to said vacuum source, vacuum cups mounted on the underside of said transfer carriage, a vacuum pump, a pipe line connecting said vacuum pump and said vacuum cups, a flow control valve in said vacuum cup pipe line, means operable by contact of said transfer carriage with articles on said table to actuate said flow control valve to couple said vacuum cups to said vacuum pump, and means in said vacuum cup pipe line responsive to a predetermined vacuum force in said line to actuate the flow control valve in said cylinder pipe line to connect the top of said cylinder to said vacuum source to initiate lifting movement of said transfer carriage after sealing engagement of said vacuum cups with articles on said table.

10. In a casing machine as claimed in claim 9, means operable by actuation of said vacuum responsive means to retract said table.

11. In a casing machine as claimed in claim 9, a choke valve in said pipe to the top of said cylinder operable during downward movement of said piston to restrict flow to the top of said cylinder to cushion the downward movement of articles gripped by said vacuum cups and permit said articles to settle slowly into a case on said case supporting means.

12. In a casing machine, a retractable accumulating table, means to supply articles to be cased to said table, means to support a case in position below said accumulating table, a piston and cylinder assembly mounted above said table, a transfer carriage connected to said piston, a source of vacuum supply, pipe lines interconnecting the top and bottom of said cylinder and said vacuum source, a flow control valve in said lines selectively operable to alternately connect the top and bottom of said cylinder to said vacuum source, vacuum cups mounted on the underside of said transfer carriage, a vacuum pump, a pipe line connecting said vacuum pump and said vacuum cups, a flow control valve in said vacuum cup pipe line, means operable by contact of said transfer carriage with articles on said table to actuate said flow control valve to couple said vacuum cups to said vacuum pump, a vacuum responsive control in said pipe line to said vacuum cups, said control comprising a body having a chamber therein in communication with said vacuum cup line, said body having a body opening to said chamber, a movable member slidable in said bore, said member being biased against movement toward said chamber, and means activated by movement of said movable member toward said chamber to actuate said control valve in the pipe lines to said cylinder to couple said vacuum source to the top of said cylinder.

13. In a casing machine, a retractable accumulating table, a transfer carriage mounted above said accumulating table, means to raise and lower said carriage, said carriage being mounted for limited vertical movement relative to said means for moving said carriage, vacuum means on said transfer carriage for engagement with articles to be cased on said accumulating table, a vacuum pump, a pipe line interconnecting said vacuum means and said pump, means beneath said accumulating table to support a case to be loaded, means in said pipe line to control flow therethrough, means operable by contact of said carriage with articles on said accumulating table to actuate said flow control means with said vacuum pump, means in said pipe line responsive to predetermined vacuum force to cause said table to retract and to cause said carriage moving means to lift said carriage, and means operated by retracting movement of said table to cause said carriage moving means to lower said carriage to a case on said case supporting means.

14. In a casing machine as claimed in claim 13, means to eject a case from said filled case supporting means.

15. In a casing machine as claimed in claim 13, said means to raise and lower said transfer carriage comprising, a vacuum cylinder, a vacuum source, pipe lines connecting the top and bottom of said cylinder to said vacuum source, a flow control valve in said pipe lines, and a choke valve in the pipe line to the top of said cylinder operable during downward movement of said carriage to said case to restrict flow to the top of said cylinder.

16. In a casing machine, means to support a case to be loaded, means to eject loaded cases from said supporting means, a transfer carriage mounted above said supporting means, means to lower and raise said transfer carriage to and from cases on said supporting means, said carriage having free vertical movement relative to said means to move said carriage, means to initiate movement of said case ejecting means carried in part by said transfer carriage and in part by said carriage moving means and operable when said carriage and said carriage moving means occupy predetermined positions simultaneously.

17. In a casing machine, an accumulating table, a transfer carriage mounted above said table, means to move said carriage vertically toward and from said table, said carriage being mounted for limited, vertical movement relative to said means for moving said carriage, and means on said carriage to grip articles to be cased on said accumulating table, said article gripping means being vacuum cups, a vacuum pump, a pipe line connecting said pump and said vacuum cups, and means in said pipe line responsive to predetermined vacuum force in said pipe line to initiate lifting movement of said transfer carriage moving means.

18. In a casing machine as claimed in claim 17, means in said pipe line to control flow therethrough, and means operable by contact of said transfer carriage with articles on said table to operate said flow control means to couple said vacuum cups to said vacuum pump.

19. In a casing machine, means to support a case to be loaded, means to eject loaded cases from said supporting means, a transfer carriage mounted above said supporting means, means to lower and raise said transfer carriage to and from cases on said supporting means, said carriage having free vertical movement relative to said means to move said carriage, means to initiate movement of said case ejecting means carried in part by said transfer carriage and in part by said carriage moving means and operable when said carriage and said carriage moving means occupy predetermined positions simultaneously, said means to eject said case being vacuum operated, a vacuum source, electrically operated means to connect said ejecting means to said vacuum source, a pair of switches in circuit with said electrically means, a switch operator carried by said transfer carriage positioned to close one of said switches when said carriage in load-depositing position occupies a predetermined position with respect to said case, and a second switch operator carried by said transfer carriage moving means to close the other of said switches when said transfer carriage moving means reaches its downward limit of travel.

20. In a casing machine as claimed in claim 19, said switch operator carried by said transfer carriage having a switch operating cam face of predetermined length to be active when said carriage occupies any position in a predetermined height range.

21. In a casing machine, vertical transfer mechanism, means to feed cases beneath said transfer mechanism, a case stop to limit feeding movement of cases to position a case longitudinally beneath said transfer mechanism, a guide rail forming part of said case feeding means, and a case positioner to bear against a case against said stop to hold the case against said guide rail and position the case laterally with respect to said vertical transfer mechanism, said case-positioner being in the form of a centrally pivoted bell-crank having its arms relatively movable and biased toward case-engaging position.

22. In a casing machine, vertical transfer mechanism, means to feed cases beneath said transfer mechanism, a case stop to limit feeding movement of cases to position a case longitudinally beneath said transfer mechanism, a guide rail forming part of said case feeding means, and a case positioner to bear against a case against said stop to hold the case against said guide rail and position the case laterally with respect to said vertical transfer mechanism, means to move incoming cases out of alignment with a case against said stop and guide rail, said case positioner when in contact with a case being in the path of movement of incoming cases to serve as a stop until a case being filled is completely removed from the machine.

References Cited in the file of this patent

UNITED STATES PATENTS

| | | |
|---|---|---|
| 1,247,722 | Rogers et al. | Nov. 27, 1917 |
| 1,437,410 | Evans | Dec. 5, 1922 |
| 1,976,128 | Hurst | Oct. 9, 1934 |
| 2,249,201 | Ferguson | July 15, 1941 |
| 2,430,878 | Kimball | Nov. 18, 1947 |
| 2,431,265 | Madsen | Nov. 18, 1947 |
| 2,681,171 | Brown | June 15, 1954 |
| 2,684,800 | Lewis | July 27, 1954 |
| 2,701,650 | Stevenson | Feb. 8, 1955 |
| 2,729,374 | Haycock | Jan. 3, 1956 |
| 2,760,316 | Okulitch | Aug. 28, 1956 |
| 2,834,167 | Loveridge | May 13, 1958 |